Nov. 9, 1965   W. H. BLOSS   3,217,189
ENERGY CONVERTER
Filed March 24, 1961

INVENTOR:
WERNER H. BLOSS

McGlew and Toren
ATTORNEYS

3,217,189
ENERGY CONVERTER
Werner H. Bloss, Winterbach, near Schorndorf, Germany, assignor to Werner Kluge, Stuttgart, Germany
Filed Mar. 24, 1961, Ser. No. 98,092
Claims priority, application Germany, Apr. 1, 1960, J 17,912
10 Claims. (Cl. 310—4)

This invention refers to an energy conversion performed in a diode, in which thermal energy is used to heat an electron-emitting cathode (emitter) situated opposite to an anode (collector) that is maintained at a lower constant temperature than the cathode. The energy converter provided by the present invention enables direct conversion of thermal energy into electrical energy.

There are known already energy converters in which the emitters require operating temperatures in the range between 1800 and 3000° C. Such high temperatures are extremely disadvantageous for technical use.

There are also known converters containing electrodes of materials having the same work functions. In such converters the energy is converted by the electron current in a retarding field in high vacuum, where very small distances (about $1/100$ mm.) and a great temperature difference between the electrodes must be kept. Such energy converters, therefore, are highly impractical for many useful purposes.

It is an object of the invention to provide an energy converter working with smaller operating temperatures and not requiring an impracticable spacing of the electrodes.

An essential characteristic of the energy converter according to this invention is a surface activation of both cathode and anode such as to result in the electron work function of the anode being lower or, at most, equal to the electron work function of the cathode; the operating temperature of the cathode not exceeding 1000° C. According to another characteristic of this invention the cathode is activated with an alkaline-earth oxide, preferably barium-oxide.

In the energy converter according to this invention the electron space charge is compensated by auxiliary cathodes which are at a lower potential as compared to the potential of the main cathode. The auxiliary cathode, according to another embodiment of the invention, is equipped with a grid so that the energy converter can be used for producing alternating current (by conversion of heat) when the grid is supplied with an alternating voltage.

Further essential characteristics of this invention become apparent from the following description.

In the drawing there is illustrated schematically cross-section views of a converter according to this invention; the illustrated converter having been used as an experimental device. It has a length of about 80 mm. and a tube diameter of about 40 mm. In the drawing.

Figure 1:
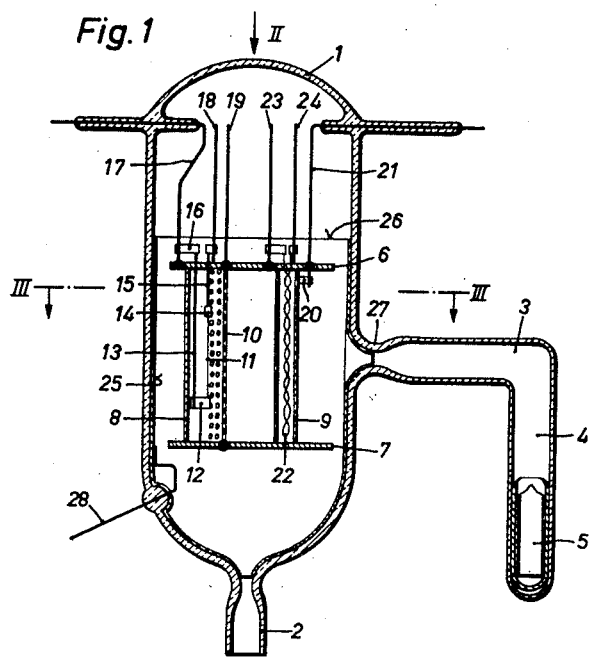
FIG. 1 is a longitudinal section through the experimental device according to the invention.

The experimental device consists of a substantially cylindrical glass vessel 1, or tube, the upper front end of which is closed by a glass wall and the bottom end having a pump nozzle 2 melted thereon so that the nozzle 2 can be connected to a high-vacuum pump (not represented). A bent pipe 3 is melted laterally onto the glass tube 1. At the bottom of the pipe end 4 which projects downwardly, there is provided a supply of cesium 5. This supply of cesium is made up of a mixture of cesium chromate and silicon.

In the interior of the glass tube 1 there are arranged two plates of mica 6 and 7 which are spaced at a distance from each other greater than the width of the plates. The plates are of substantially square shape and are supported with their corners on the walls of the glass tube or vessel (See FIGS. 2 and 3). Between the two plates of mica 6 and 7 there are arranged a pipe 8 and a pipe 9, both of nickel (Ni). The diameter of pipe 8 exceeds that of pipe 9. The pipe 8 is closed on the side nearest the glass tube 1 but is perforated on the far side 10; i.e. the side closer to the pipe 9.

Inside pipe 8 an auxiliary cathode filament 11 of tungsten, coated with a film of barium, is arranged between a connection plate 12, which is fixed to the end of a holding wire 13, and a connection piece 14 which is fixed to the end of a holding wire 15. By means of a connection piece 16, the holding wire 13 communicates with a connecting wire 17 which is led out of the vessel without compromising the hermetic integrity of the vessel. The holding wire 15 communicates via a corresponding connection with a wire 18 led outwardly from the vessel without compromising the hermetic integrity of the vessel. The pipe 8 is connected to a wire 19 led outwardly again without compromising the hermetic integrity of the vessel.

The pipe 9 forms the main cathode. The pipe 9 is connected via a connection piece 20 to a wire 21 led outwardly from the interior of the vessel without compromising the hermetic integrity of the vessel. Inside pipe 9 a heating wire 22 is arranged such that its ends are each connected to a connecting wire 23 and 24, respectively; the wires 23 and 24 being led out of the vessel without compromising the hermetic integrity of the vessel.

Figure 2:
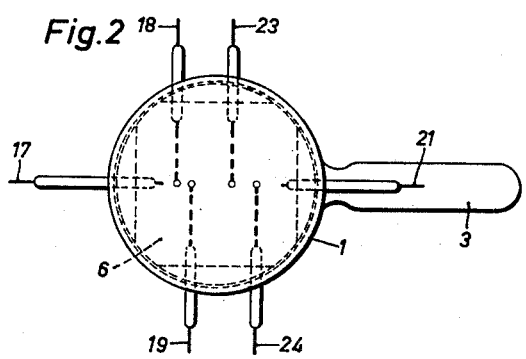
FIG. 2 is a plan view in the direction of arrow II of FIG. 1.
Figure 3:
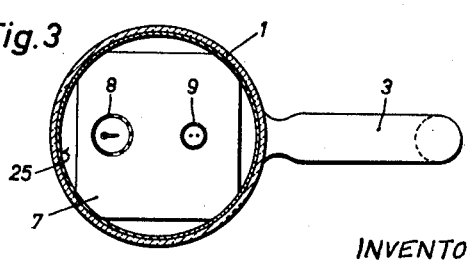
FIG. 3 is a section on line III—III of FIG. 1.

The hermetic integrity of the vessel 1 is not compromised by the manner in which the wires 17, 18, 19, 21, 23 and 24 are brought out from the interior of the vessel to the outside of the vessel. As is shown at FIGS. 1 and 2, each of these wires passes from the interior of the vessel to the exterior of the vessel by passing, coaxially, through an encapsulating protuberance of glass which is integrally formed with the vessel material. The manner of coaxially encapsulating lead wires within glass, so that the ends of the lead wires may protrude from opposing ends of the encapsulating glass is a process well known to those familiar with the glass forming and allied arts. For example, lead wires may be passed through molten glass which is subsequently allowed to cool, thereby encapsulating a given length of lead wires.

The anode of the device has a film of silver 25 as a base, or substratum, which covers the inner wall of the glass vessel 1 from approximately line 26 to the pump nozzle 2. Such films of silver are produced chemically in a known manner. After the silver film 25 is oxidized in a known manner and the remaining gas is pumped out of the glass tube, the cesium is evaporated by heating it with a high-frequency coil (not represented) surrounding pipe section 4. The cesium vapour is condensed on the film of silver oxide and in this way the anode is formed. The anode, then, has the following structure:

$$(Ag)—Cs_2O, Cs, Ag—Cs$$

After the anode is formed, pipe 3 is melted off at the throat 27 and any cesium vapour which might still be present in the tube is sucked off through the pump nozzle 2. The tube is now filled with an inert gas, e.g. argon, at a pressure of 0.5 Torr. Then the pump nozzle 2 is closed and melted off.

For operation of the device an appropriate magnitude of voltage is applied to the auxiliary cathode 11 and to the main cathode 9 in order to bring about a discharge between the auxiliary cathode and the main cathode. When the main cathode 9 is heated, which in the test arrangement is done by electrically heating the heating wire 22, there is produced electric current and electric voltage between the wire 21 (main cathode) and the wire, or bus bar, 28 joined to the anode 25. The amount of this output power is dependent on the amount of the heating power the cathode 9 is supplied with. Thus heating power is converted into electrical energy.

The grid formed by pipe 8 to which an appropriate voltage is applied serves to control the auxiliary discharge.

For example, in operating the experimental device according to the invention, the heating power of the auxiliary cathode 11 was approx. 70 mw. and the power for the auxiliary discharge approx. 50 mw. The output voltage under these conditions was approx. 1.5 v., the output current 1 a.

The main cathode 9 was heated electrically requiring a heating power $N_H$ of about 7 w.

The effective output power $N_A$ is therefore 1.5–0.12, or ≈1.4 w.; the efficiency of this device $\eta = N_A/N_H \approx = 20\%$. The efficiency may be further improved by making the device longer; i.e., increasing the overall length of the tubular vessel 1. In this way the relative heat losses by conduction through the pins may be reduced.

As emitter materials BaO-cathodes or dispenser cathodes (porous metal cathodes with emitting substances of alkaline earths or alkalis) are advantageous in that operation in the temperature range between 750 and 900° C. is made possible. The collector consists of either the same materials as the emitter or semiconducting materials having low work function and functioning at temperatures up to 250° C., e.g. films of copper oxide, gold oxide, or silver oxide activated by cesium. The difference of contact potential in this case is smaller than or at the most equals zero.

The converter of the present invention is highly efficient in that the emitter is so situated that it is surrounded by a collector having a large area. By virtue of the auxiliary discharge between the main and auxiliary cathodes and the space charge compensation which produces positive ions when such discharge is occasioned, a negative voltage drop at the collector, or anode, is obtained. The anode voltage drop is:

$$U_A = -1.98 \cdot 10^{-4} \, T_e \log j_D/j_a$$

$T_e$ representing the electron temperature, $j_D$ representing the diffusion current density of plasma electrons and $j_a$ representing the density of collector current.

Such inert gases as argon, krypton, xenon or the like may be used to fill the vessel. It is preferable to include with such inert gases small fractions of alkali vapors; the pressure being 0.2 to 0.8 mm. Hg. Advantageously, the heat losses of the emitter, due to thermal convection and thermal conduction, are smaller when gases having high mass numbers are used.

The output current of the converter is defined by the saturation current of the emitter as well as by current and voltage of the auxiliary discharge. The total output voltage is composed of negative difference of contact potential, the voltage equivalent to kinetic energy of the emitted electrons and negative anode drop voltage.

By variation of current and voltage of the auxiliary discharge it is possible to control output voltage, output current and thereby output power; and to adapt the converter to the load. By means of small changes of voltage at a grid in the auxiliary discharge circuit the auxiliary discharge and thereby the output current can be switched on and off periodically. When connected with a transformer in the circuit relatively high output voltages can be produced.

The maximum output power when using pulsating auxiliary direct current is obtainable with switching frequencies which are inversely proportional to the time of diffusion and deionization of the plasma between the electrodes (resonance frequency). This frequency, defined by gas pressure and kind of gas, in the device described here is in the range between about 200 and 900 cycles per second.

The converter according to this invention offers the great advantage that it works at relatively low operating temperatures. The distance between the electrodes is of secondary importance so that with greater diameters of the collector cylinder maximum temperatures of the collector of 200° C. can easily be maintained. By means of a negative anode drop voltage with regard to the electron temperature of the plasma produced in the auxiliary discharge the output power can be increased as compared with that obtained in the known types of converters. By the auxiliary discharge or by the grid-controlled auxiliary discharge the output power can be regulated. The grid in the auxiliary discharge enables nearly powerless-periodical-switching of the output current. By an appropriate choice of the switching frequency (resonance frequency) the output current alternating current can be increased.

In practical devices the thermal energy, which is used for heating the emitter, may be produced by chemical reactions or by nuclear reactions, e.g., in a nuclear reactor. In this case the main cathode may be formed as a hollow cylinder through which a liquid is conducted as a carrier of the heat to be converted into electrical energy. When using flat-shaped cathodes and anodes the cathode may form one side of the converter being in thermal connection with the heat source.

I claim:

1. A thermal to electric energy converter in which electrons are thermionically translated from an electron emitting means past at least one auxiliary electrode to an electron collecting means, wherein said converter is characterized by: said electron collecting means completely laterally surrounding both said electron emitting means and said auxiliary electrode in spaced relation thereto; the electron collecting means being operated at a lower temperature than the electron emitting means, the temperature of said emitting means being not greater than 1000° C.; and said collecting and emitting means being comprised of activation material such that the electron work function of the electron collecting means is not greater than the electron work function of the electron emitting means, said energy converter functioning in an atmosphere of a heavy inert gas.

2. An energy converter according to claim 1, wherein the activation material of said electron emitting means comprises alkaline earth oxide.

3. An energy converter according to claim 2, wherein said alkaline oxide is comprised of Barium oxide.

4. An energy converter according to claim 1, wherein the electron emitting means is a dispenser-type cathode charged with alkaline material.

5. An energy converter according to claim 1, wherein said electron collecting means comprises an oxide of metal activated with at least one alkaline material.

6. An energy converter according to claim 5, wherein said electron collecting means is comprised of silver oxide activated with Cesium.

7. A thermal to electric energy converter in which electrons are thermionically translated from an electron emitting means past at least one auxiliary electrode to an electron collecting means, wherein said converter is characterized by: said electron collecting means completely laterally surrounding both said electron emitting means and said auxiliary electrode in spaced relation thereto; the collecting means being at a lower temperature than said emitting means, the temperature of said emitting means being not greater than 1000° C.; the auxiliary electrode being at a lower electric potential than said emitting means, whereby the electron space charge is compensated; and said emitting means and collecting means comprising activation material such that the electron work function of the collecting means is not greater than the electron work function of said emitting means, said energy converter functioning in an atmosphere of a heavy inert gas selected from the group consisting of argon, krypton, and xenon.

8. An energy converter according to claim 7, wherein said auxiliary electrode is supplied with a varying electric potential whereby a corresponding varying current is translated to said electron collecting means.

9. A thermal to electric energy converter in which electrons are thermionically translated from an electron emitting means past at least one auxiliary electrode to an electron collecting means, wherein said converter is characterized by: the collecting means being at a lower temperature than said emitting means, the temperature of said emitting means being not greater than 1000° C.; the auxiliary electrode being at a lower electric potential than said emitting means; whereby the electron space charge is compensated; and said emitting means and collecting means comprising activation materials such that the electron work function of the collecting means is not greater than the electron work function of said emitting means; said auxiliary electrode being supplied with a varying electric potential whereby a corresponding varying current is translated into said electron collecting means; said energy converter functioning in an atmosphere of a heavy inert gas and the frequency of the varying voltage supplied to said auxiliary electrode being resonant with the pressure of said inert gas atmosphere.

10. An energy converter according to claim 1, wherein the electron emitting means forms a portion of a wall of the converter and is in thermal connection with a source of heat electron emitting means.

References Cited by the Examiner

UNITED STATES PATENTS

| | | | |
|---|---|---|---|
| 1,481,422 | 1/24 | Holst | 313—226 |
| 2,099,531 | 11/37 | Passarge | 313—247 |
| 2,611,880 | 9/52 | Webster | 313—189 |
| 2,975,320 | 3/61 | Knauer | 310—4 |
| 3,021,472 | 3/62 | Hernqvist | 310—4 |
| 3,129,345 | 4/64 | Hatsopoulos | 310—4 |

FOREIGN PATENTS 797,872  7/58  Great Britain.

OTHER REFERENCES

Nobel Gas Hot Cathode Diodes by Medicus and Wehner, Journal of Applied Physics, volume 22, 1951, page 1389.

The Plasmatron by Johnson and Webster, Proceedings of the I.R.E., June, 1952, page 645 to 647.

Thermionic Energy Converter by Hernqvist et al. RCA Review, June, 1958, pp. 244–258.

ORIS L. RADER, *Primary Examiner.*

MILTON O. HIRSHFIELD, DAVID X. SLINEY,
*Examiners.*